Patented Mar. 3, 1942

2,275,182

UNITED STATES PATENT OFFICE 2,275,182

MANUFACTURE OF CATALYSTS

Vladimir N. Ipatieff and Raymond E. Schaad, Chicago, Ill., assignors to Universal Oil Products Company, Chicago, Ill., a corporation of Delaware No Drawing. Application June 20, 1940, Serial No. 341,442

6 Claims. (Cl. 252—251)

This invention relates to the manufacture of catalysts useful in accelerating various types of reactions among organic compounds.

In a more specific sense the invention is concerned with the production of a particular type of solid granular catalyst which has special properties both in regard to its activity in accelerating and directing polymerizing reactions, in its stability in service and during reactivation periods and in its non-corrosive properties when employed in ordinary commercial apparatus comprising principally various types of steel.

The type of catalyst to be described presently is particularly adapted to cause the controlled polymerization of normally gaseous olefins such as those present in the by-product gases from oil cracking operations to produce additional yields of high antiknock blending fluids.

In one specific embodiment the present invention comprises a process for manufacturing catalysts suitable for accelerating reactions among organic compounds by incorporating acids of phosphorus with adsorbent materials preferably of a siliceous character, calcining the primary mixture at a temperature corresponding to extensive dehydration of the acid and hardening of the composite particles, partially rehydrating said acid by means of water and/or steam at a temperature lower than that employed in the calcining step, and heating the resultant material in a substantially inert gas to form a granular catalytic material of improved structural strength and activity.

The essential and active ingredient of the solid catalysts which are manufactured by the present process for use in organic reactions is an acid of phosphorus, preferably one in which the phosphorus has a valence of 5. The acid may constitute 80% or more of the catalyst mixture ultimately produced, and in most cases is over 30% by weight thereof. Of the various acids of phosphorus, the orthophosphoric acid ($H_3PO_4$) finds general application in the primary mixtures, due partly to its cheapness and the readiness with which it may be procured although the invention is not restricted to its use but may employ any of the other acids of phosphorus insofar as they are adaptable. It is not intended to infer, however, that the different acids of phosphorus which may be employed will produce catalysts which have identical effects upon any given organic reaction as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. (By this is meant that the ortho acid may contain a definite percentage of the pyro acid corresponding to the primary phase of dehydration of the ortho acid.) Within these concentration ranges, the acids will be thick liquids of varying viscosity and readily incorporated with adsorbent materials. In practice it has been found that pyrophosphoric acid corresponding to the formula $H_4P_2O_7$ is readily incorporated with siliceous and relatively inert carriers at temperatures somewhat above its melting point (142° F.) and that the period of heating which is given to the pyroacid-adsorbent mixtures may be changed from that employed with the ortho acid.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$, which in turn may be considered as the acid resulting when 3 molecules of water are lost by 4 molecules of orthophosphoric acid, $H_3PO_4$. The tetraphosphoric acid therefore may obviously be manufactured by the gradual and controlled dehydration by heating of ortho or pyrophosphoric acids or by adding phosphorus pentoxide to these acids in proper amount. When the latter procedure is followed, phosphorus pentoxide is gradually added (while absorbing the heat of the reaction) until it amounts to 520% of the total water present. After a considerable period of standing at ordinary temperatures, the crystals of the desired acid separate from the viscous liquid and it is found that they melt at approximately 93° F. and have a specific gravity of 1.1886 at 60° F.

It is recognized that the manufacture of solid phosphoric acid catalysts by the general steps of mixing phosphoric acids and adsorbents to a paste, calcining the paste to a solid cake, grinding and sizing, and, if necessary, rehydrating the granular particles is known, being disclosed in United States Patents Nos. 1,993,512, 1,993,513, 2,120,702 and 2,157,208. In preparing the catalysts by these prior methods, however, the procedure followed consisted essentially of the steps of mixing, drying, calcining, and hydrating. The calcining was carried out at a temperature in the approximate range of 850–950° F. and the subsequent rehydrating was effected by treatment with steam at a temperature of the order of 450–500° F. under substantially atmospheric pressure. We have found that catalysts of improved activity and structural strength are obtained by calcining previously dried composites of an acid of phosphorus and a siliceous adsorbent at a temperature in the approximate range of 600–950° F. to dehydrate the acid past the point corresponding to most effective catalytic action, then rehydrating by using steam at a temperature in the approximate range of 400–

600° F. under atmospheric pressure to bring the acid back to an optimum stage of hydration for greatest catalytic efficiency, and then treating the hydrated material at approximately the hydrating temperature with air or other substantially inert gas to form a granular catalyst of improved structural strength and activity.

The materials which may be employed as adsorbents or carriers for acids of phosphorus are roughly divided into two classes. The first class comprises materials of predominantly siliceous character and includes diatomaceous earth, kieselguhr, and artificially prepared porous silica. The second class of materials which may be employed either alone or in conjunction with the first class comprise generally certain members of the class of aluminum silicates and includes such naturally occurring substances as various fuller's earths and clays such as bentonite, montmorillonite, acid-treated clays, etc. Each adsorbent or supporting material which may be used alternatively will exert its own specific influence upon the net effectiveness of the catalyst composite which will not necessarily be identical with that of other members of the class.

Catalysts may be prepared from an acid of phosphorus such as ortho-, pyro-, and/or tetraphosphoric acid by the successive steps of (1) mixing the phosphoric acid with a finely divided and relatively inert carrier generally at an elevated temperature in the approximate range of 250–400° F. to form a rather wet paste (the acid ordinarily being in major proportion by weight); (2) drying the pasty material at a temperature of the order of 300–550° F. to form a substantially solid material; (3) calcining said substantially solid material at a temperature of the order of 600–950° F.; (4) grinding and sizing the calcined material to produce particles of usable mesh; (5) rehydrating said particles at a temperature of the order of 400–600° F.; (6) and heating said rehydrated particles in an inert gas at a temperature in the approximate range of 400–600° F. to produce catalyst particles of higher structural strength and optimum polymerizing activity.

This procedure may be varied by forming particles from the original paste by extrusion or pelleting methods and following with the steps of drying, calcining, rehydrating, and heating in a substantially inert gas.

Solid phosphoric acid catalysts prepared in accordance with the present invention for use in polymerization of olefins and in other conversion reactions among organic compounds, are precalcined before use both to fix the composition of the acid and to form particles of a granular structure capable of withstanding the conditions of service to which they are subjected during use and subsequent reactivation.

The catalysts prepared in accordance with the foregoing general method are somewhat hygroscopic but when preserved from moisture contacts resulting either from exposure to air or gas mixtures containing steam, are essentially non-corrosive in steel equipment and highly effective in fostering polymerization reactions among olefinic hydrocarbons and in accelerating other types of organic reactions. When used for polymerizing normally gaseous olefins, the particles are generally placed in vertical cylindrical treating towers and the olefin-containing gas mixtures passed downwardly therethrough under temperatures of the approximate order of 400–500° F. and pressures of 100–300 pounds per square inch when dealing with such mixtures as stabilizer refluxes which may contain from approximately 10 to 30% of the so-called higher olefins comprising propene and butenes. When operating upon butane-butene fractions the catalysts are effective under conditions favoring the maximum utilization of both n-butenes and iso-butene which involves mixed polymerization at temperatures of form approximately 275–325° F. under pressures of 550–750 pounds per square inch.

In utilizing the present types of catalysts in miscellaneous organic reactions they may be employed in the same way as they are used when polymerizing olefins in case the reactions are essentially vapor phase and they may be employed also in suspension in liquid phase in various types of equipment.

When during use these catalysts become coated with carbonaceous or hydrocarbonaceous deposits, they may be reactivated by treating with superheated steam at a temperature in the neighborhood of 600–700° F. to remove distillable substances, oxidizing said deposits with air or with gas mixtures of controlled oxygen concentration at a temperature in the approximate range of 800–1000° F., followed by contacting with superheated steam at about 400–600° F. under atmospheric pressure to rehydrate the acid to the most desirable composition, and then heating at approximately 400–600° F. in air or in another inert gas to form activated catalytic material of high structural strength and activity. Rehydration at higher temperatures may be made under steam pressures corresponding approximately to the water vapor pressure of the catalyst at the operating temperature.

With suitable modifications in the details of operation, the present type of catalyst may be employed in a large number of organic reactions, including polymerization of olefins as already mentioned. Typical cases of reactions in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols, and aldehydes, etc., reactions involving the hydro-halogenation of unsaturated organic compounds, isomerization reactions, ester formation by the interaction of carboxylic acids and olefins, etc. The specific procedure for utilizing the present type of catalyst in miscellaneous organic reactions will be determined by the chemical and physical characteristics and the phase of the reacting constituents.

The following examples of the preparation of a catalyst comprised within the scope of this invention and of results obtained in its use for polymerizing olefinic gases are characteristic, although the exact details set forth are not to be construed as imposing undue limitations upon the generally broad scope of the invention:

*Example I*

70% by weight of pyrophosphoric acid and 30% by weight of kieselguhr were mixed at a temperature of approximately 350° F. The resulting mixture of a plastic-like consistency was extruded through a plate having circular holes of approximately $\tfrac{3}{16}''$ diameter. The cylindrical extrudate was cut into lengths of approximately $\tfrac{1}{4}''$ to produce formed particles which were dried in air at approximately 550° F. until they were sufficiently dry to retain their shape after which they were calcined for 16 hours at 900° F. The calcined particles were then heated for 16 hours at 500° F. in an atmosphere of superheated steam and finally heated for ¼ hour at 580° F. to expel excess steam and produce catalyst particles of high crushing strength and activity, the latter being measured by the production of polymer from propene under experimentally determined and standardized operating conditions. The results obtained on this catalyst are given in Table I in comparison with results obtained on a catalyst prepared similarly except that the final air-treating step was omitted.

TABLE I

*Activity and strength of polymerizing catalysts*

|  | Catalyst No. | |
| --- | --- | --- |
|  | 1 | 2 |
| Final treatment | Heated in air | Not heated in air |
| Activity | 72 | 68 |
| Crushing strength, pounds: | | |
| Average | 10.5 | 7.4 |
| Maximum | 16.5 | 9.0 |
| Minimum | 3.5 | 2.0 |
| Pellets below 5 lbs. crushing strength per cent | 23 | 43 |

*Example II*

A catalyst prepared as described in Example I was used during a period of 60 days for polymerizing propene and butenes from a cracked gas mixture. During this period of use the activity of the catalyst decreased from 72% to 0 while the average crushing strength increased from 10.5 to 17 pounds. This used catalyst of 0% activity was reactivated by heating in an oxygen-containing gas at 750–930° F. until substantially all carbonaceous and hydrocarbonaceous materials deposited thereon were burned. The burned catalyst was then steamed for approximately 4 hours at 535–555° F. A portion of the burned and steamed catalyst was heated further in dry air at 535–555° F. for 15 minutes. As shown by the comparative results in Table II, this final step of heating in air was beneficial in increasing the crushing strength of the catalyst pellets as well as in improving the activity of the reactivated catalyst over that obtained by merely burning and steaming.

TABLE II

*Activity and strength of reactivated polymerizing catalyst*

|  | Catalyst No. | |
| --- | --- | --- |
|  | 1 | 2 |
| Final treatment | Heated in in air. | Not heated in air. |
| Loss on burning weight percent | 29.2 | 29.2 |
| Weight gain on burned catalyst, percent: | | |
| After steaming |  | 2.4 |
| After steaming and heating in air | 1.4 |  |
| Average crushing strength of catalyst, pounds: | | |
| After burning | 11.0 | 11.0 |
| After steaming |  | 2.0 |
| After steaming and heating in air | 5.9 |  |
| Reactivated catalyst: | | |
| Activity | 58 | 46 |
| Maximum crushing strength, pounds | 9 | 5 |
| Minimum crushing strength, do | 3 | 0.5 |

The character of the invention and the commercial value thereof are apparent from the preceding specification and examples of results given, but neither section is to be considered as imposing undue limitations upon the generally broad scope of the invention.

We claim as our invention:

1. A process for manufacturing catalysts which comprises mixing a phosphoric acid with a siliceous material, calcining the mixture at a temperature of at least 600° F., then steaming the mixture at a temperature not substantially above 600° F., and treating the steamed mixture with a substantially dry inert gas at a temperature in the approximate range of 400–600° F.

2. A process for manufacturing catalysts which comprises mixing a phosphoric acid with a siliceous material, calcining the mixture at a temperature of from approximately 600 to 950° F., then steaming the mixture at a temperature in the approximate range of 400–600° F., and treating the steamed mixture with a substantially dry inert gas at a temperature of from about 400 to 600° F.

3. A process for manufacturing catalysts which comprises mixing an acid of phosphorus with a solid adsorbent, calcining the mixture at a temperature of from approximately 600 to 950° F., then steaming the mixture at a temperature in the approximate range of 400–600° F., and treating the steamed mixture with a substantially dry inert gas at a temperature of from about 400 to 600° F.

4. A process for manufacturing catalysts which comprises mixing pyrophosphoric acid with a siliceous material, calcining the mixture at a temperature of from approximately 600 to 950° F., then steaming the mixture at a temperature in the approximate range of 400–600° F., and treating the steamed mixture with a substantially dry inert gas at a temperature of from about 400 to 600° F.

5. A process for manufacturing catalysts which comprises mixing pyrophosphoric acid with a solid adsorbent, calcining the mixture at a temperature of from approximately 600 to 950° F., then steaming the mixture at a temperature in the approximate range of 400–600° F., and treating the steamed mixture with a substantially dry inert gas at a temperature of from about 400 to 600° F.

6. A process for manufacturing catalysts which comprises mixing tetraphosphoric acid with a solid adsorbent, calcining the mixture at a temperature of from approximately 600 to 950° F., then steaming the mixture at a temperature in the approximate range of 400–600° F., and treating the steamed mixture with a substantially dry inert gas at a temperature of from about 400 to 600° F.

VLADIMIR N. IPATIEFF.
RAYMOND E. SCHAAD.